(12) United States Patent
Landry, III et al.

(10) Patent No.: US 8,911,622 B1
(45) Date of Patent: Dec. 16, 2014

(54) OIL SKIMMING APPARATUS

(71) Applicants: Wallace J. Landry, III, Metairie, LA (US); M. Thomas Hobson, Chagrin Falls, OH (US); Richard Forbes, Lafitte, LA (US); Brian Slone, Hammond, LA (US)

(72) Inventors: Wallace J. Landry, III, Metairie, LA (US); M. Thomas Hobson, Chagrin Falls, OH (US); Richard Forbes, Lafitte, LA (US); Brian Slone, Hammond, LA (US)

(73) Assignee: Abanaki Corporation, Chagrin Falls, OH (US)

( * ) Notice: Subject to any disclaimer, the term of this patent is extended or adjusted under 35 U.S.C. 154(b) by 0 days.

(21) Appl. No.: 13/782,209

(22) Filed: Mar. 1, 2013

Related U.S. Application Data

(63) Continuation of application No. 12/605,069, filed on Oct. 23, 2009, now Pat. No. 8,388,839.

(60) Provisional application No. 61/108,927, filed on Oct. 28, 2008.

(51) Int. Cl.
*E02B 15/10* (2006.01)

(52) U.S. Cl.
CPC .............. *E02B 15/10* (2013.01); *Y10S 210/924* (2013.01)
USPC ........ 210/232; 210/242.4; 210/396; 210/402; 210/488; 210/496; 210/497.01; 210/924

(58) Field of Classification Search
CPC .......... E02B 15/103; C02F 1/40; C02F 1/285; C02F 2101/32; C02F 2103/007
USPC .......... 210/232, 242, 3, 242.4, 396, 402, 488, 210/496, 497.01, 924, 502.1
See application file for complete search history.

(56) References Cited

U.S. PATENT DOCUMENTS

| | | | | |
|---|---|---|---|---|
| 4,769,142 | A * | 9/1988 | Withnall | 210/242.4 |
| 5,961,825 | A * | 10/1999 | Love | 210/238 |
| 6,261,451 | B1 * | 7/2001 | Genevrino | 210/236 |
| 2010/0170844 | A1 * | 7/2010 | Hobson | 210/396 |

* cited by examiner

*Primary Examiner* — Matthew O Savage
(74) *Attorney, Agent, or Firm* — Benesch, Friedlander, Coplan & Aronoff, LLP

(57) ABSTRACT

An apparatus and method for skimming oil and other liquid hydrocarbons and contaminates floating at the surface of a body of water or other suspending liquid. A rigid skimming surface such as a drum or disc is floatably supported on pontoons. The skimming surface is rotatable about an axis substantially parallel to the water surface. The skimming surface is covered with removably attached sorbent material which improves the efficiency of the oil recovery operation and which, when worn or soggy, can be removed and discarded without discarding the skimming surface.

13 Claims, 9 Drawing Sheets

FIG. 10.

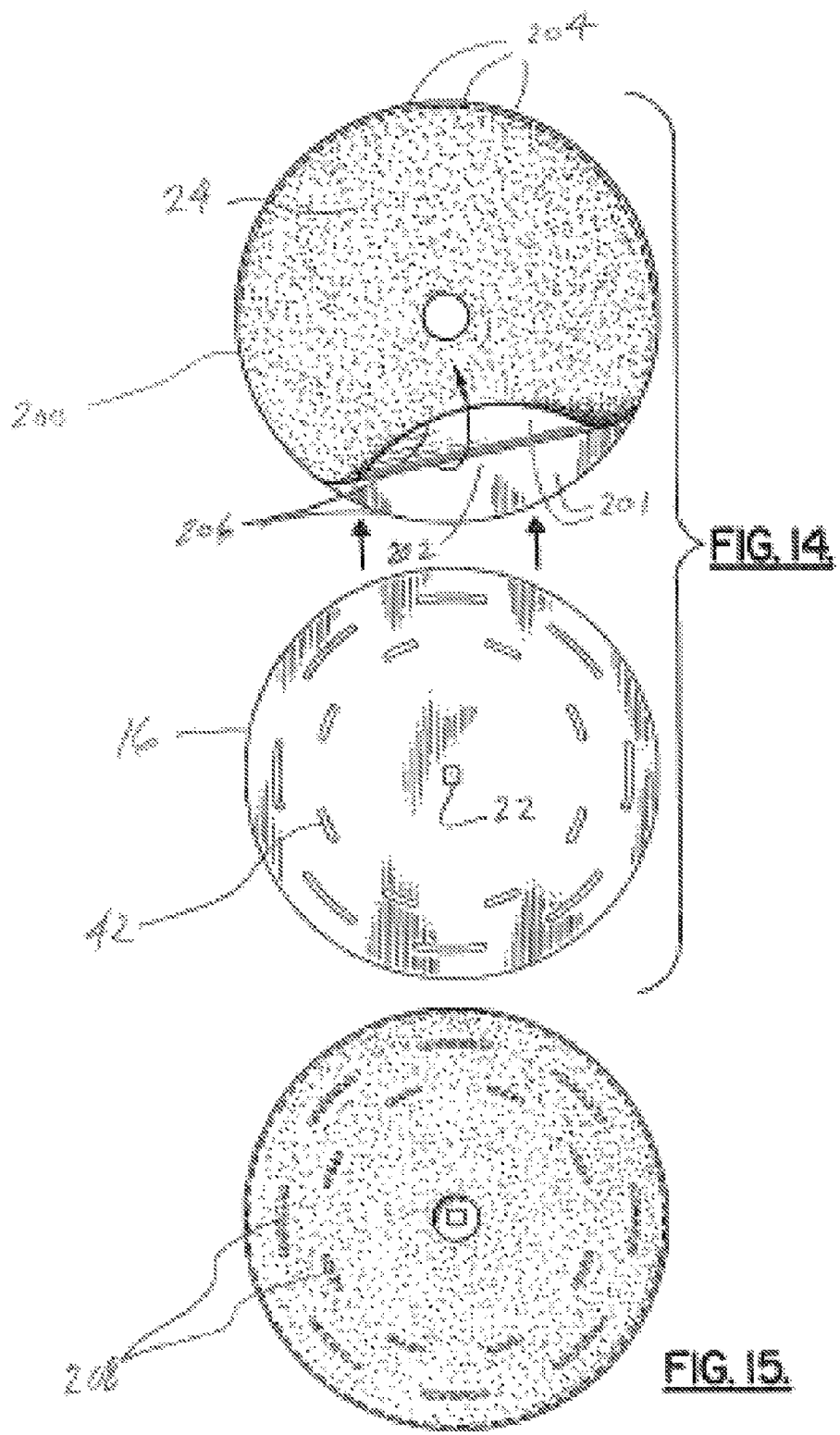

OIL SKIMMING APPARATUS

REFERENCE TO PRIOR APPLICATION

This application is a divisional of, and claims the benefit and priority of, U.S. patent application Ser. No. 12/605,069 filed on Oct. 23, 2009, entitled "Oil Skimming Apparatus and Method," now U.S. Pat. No. 8,388,839, which claims the benefit and priority of U.S. Provisional Patent Application Ser. No. 61/108,927 filed on Oct. 28, 2008, each of which are hereby incorporated herein by reference in its entirety.

FIELD OF THE INVENTION

The present invention relates to an apparatus and method for recovering and removing oil floating on a body of water by scraping the oil from one or more rigid skimming surfaces such as discs or drums that are continuously rotated into and out of the floating oil.

BACKGROUND OF THE INVENTION

The present invention relates to skimming devices used to recover and remove oil and other liquid hydrocarbons and contaminates floating at, i.e., on or near, the surface of a suspending liquid such as water, as for example, to recover and remove oil that has been accidentally spilled from a marine vessel or ruptured pipeline situated in or near a body of water. Typically, due to the relative density of most oils and other liquid hydrocarbons as compared to water, the liquid hydrocarbons will be located at the water surface. More particularly, the present invention relates to skimming devices having rigid skimming surfaces such as discs and drums, wherein the discs and drums are covered with removably attached sorbent material and wherein said sorbent material (a) improves the efficiency of the recovery operation, and (b) can be easily removed and replaced.

One of the advantages of the invention disclosed herein resides in the fact that the sorbent material covering is removably attached to the discs and drums, thereby facilitating removal of said sorbent material in the event that the operator needs or wants to replace used sorbent material with fresh sorbent material, as for example if the material becomes worn, soggy, or otherwise unable to continue to efficiently sorb oil. This advantage is absent from the prior art.

Moreover, environmental regulations generally require that oil recovery equipment must be free of all contaminants prior to being released from the oil recovery site. Compliance with such regulations is comparatively easy and inexpensive for the present invention, as the contaminated material covering the discs and drums can be quickly and easily removed from the discs and drums, allowing such contaminated material to be bagged and discarded. By way of contrast, the only way to clean contaminants from discs in the prior art is to either throw away the discs themselves, or to wash them in place at the recovery site. The fanner alternative is prohibitively expensive. The latter alternative would require so much time and effort, and generate so much contaminated wash water which in turn would have to be treated, as to render the prior art impractical.

BRIEF SUMMARY OF INVENTION

The present invention provides a rigid-surface oil skimmer, such as a disc skimmer and a drum skimmer, with removably attached sorbent material covering the rigid skimming surfaces, said sorbent material dramatically improving the efficiency of the oil recovery operation. If the sorbent material becomes soggy, worn out or otherwise unable to continue to efficiently sorb oil, or when the oil recovery operation has been completed, the sorbent material can be quickly and easily removed from the rigid skimming surfaces, thereby avoiding the need for more costly and impractical alternatives like discarding or cleaning the rigid skimming surfaces at the recovery site.

For disc skimmers, the sorbent material covering is preferably shaped in the form of semicircular or fully circular pockets which accommodate and sandwich each disc. For drum skimmers, the sorbent material covering preferably has a rectangular shape and is wound around the cylindrical surface of the drum. Overlapped and overlapping flaps of the sorbent material coverings are configured in a way to prevent the scraper from unintentionally pulling them apart, and said flaps are fastened together in a manner which can be quickly and easily unfastened for removal of the material coverings.

BRIEF DESCRIPTION OF DRAWINGS

FIG. 10 is a fragmentary, perspective view depicting part of the row of clockwise-rotating discs appearing in FIG. 1.

FIG. 14 is a side elevational view showing a disc and an alternative embodiment of a disc covering comprised of sorbent material shaped in the form of a fully circular pocket having an opening defined by two flaps, indicating how the disc is to be slid inside and covered by the pocket.

FIG. 15 is a side elevational view showing the disc depicted in FIG. 14 after it has been sandwiched inside and completely covered by the alternative pocket depicted in FIG. 14.

DETAILED DESCRIPTION

Figure 1:
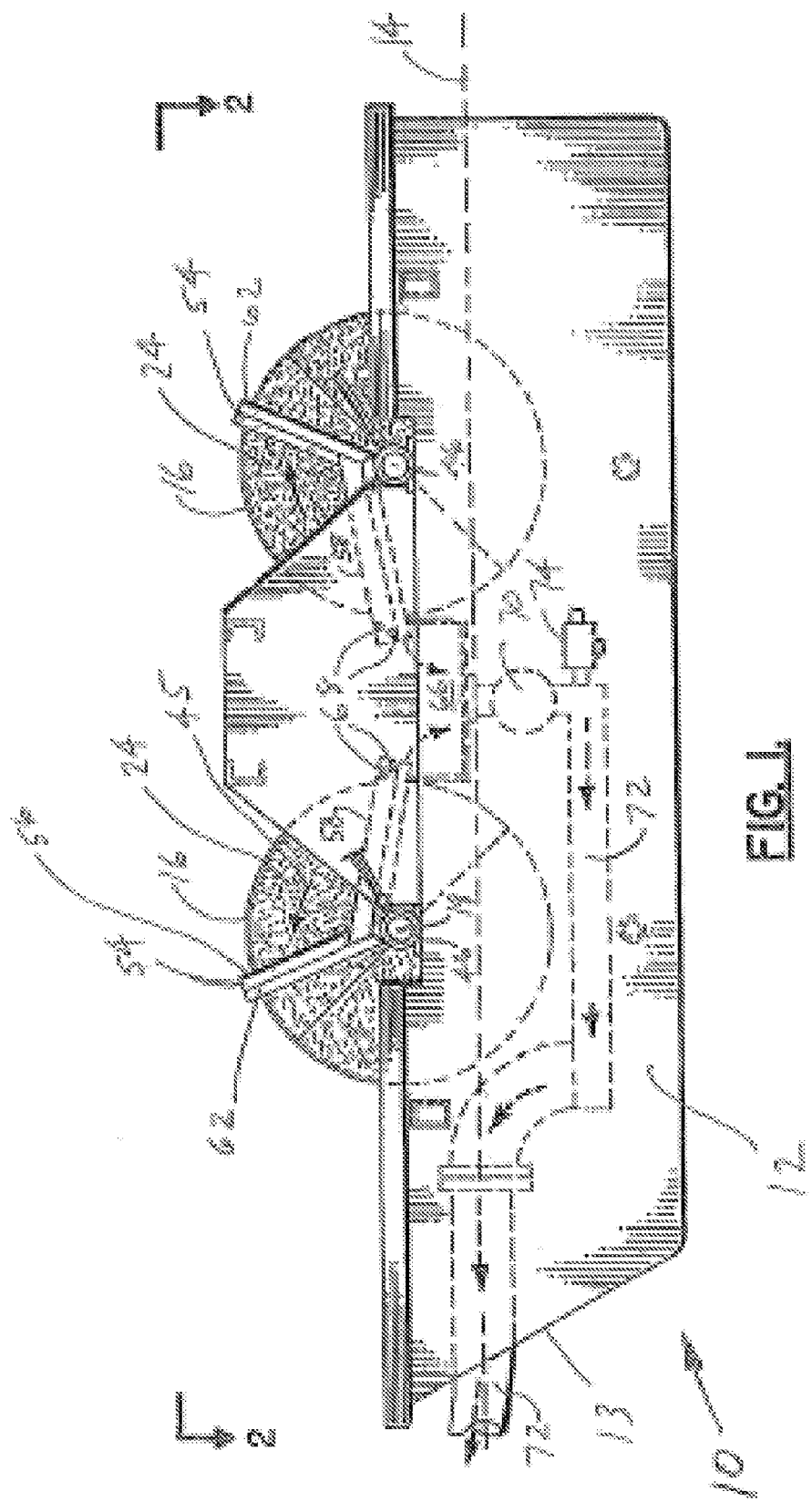
FIG. 1 is a side elevational view of the present invention as embodied in connection with a disc skimmer having two rows of discs.
Figure 2:
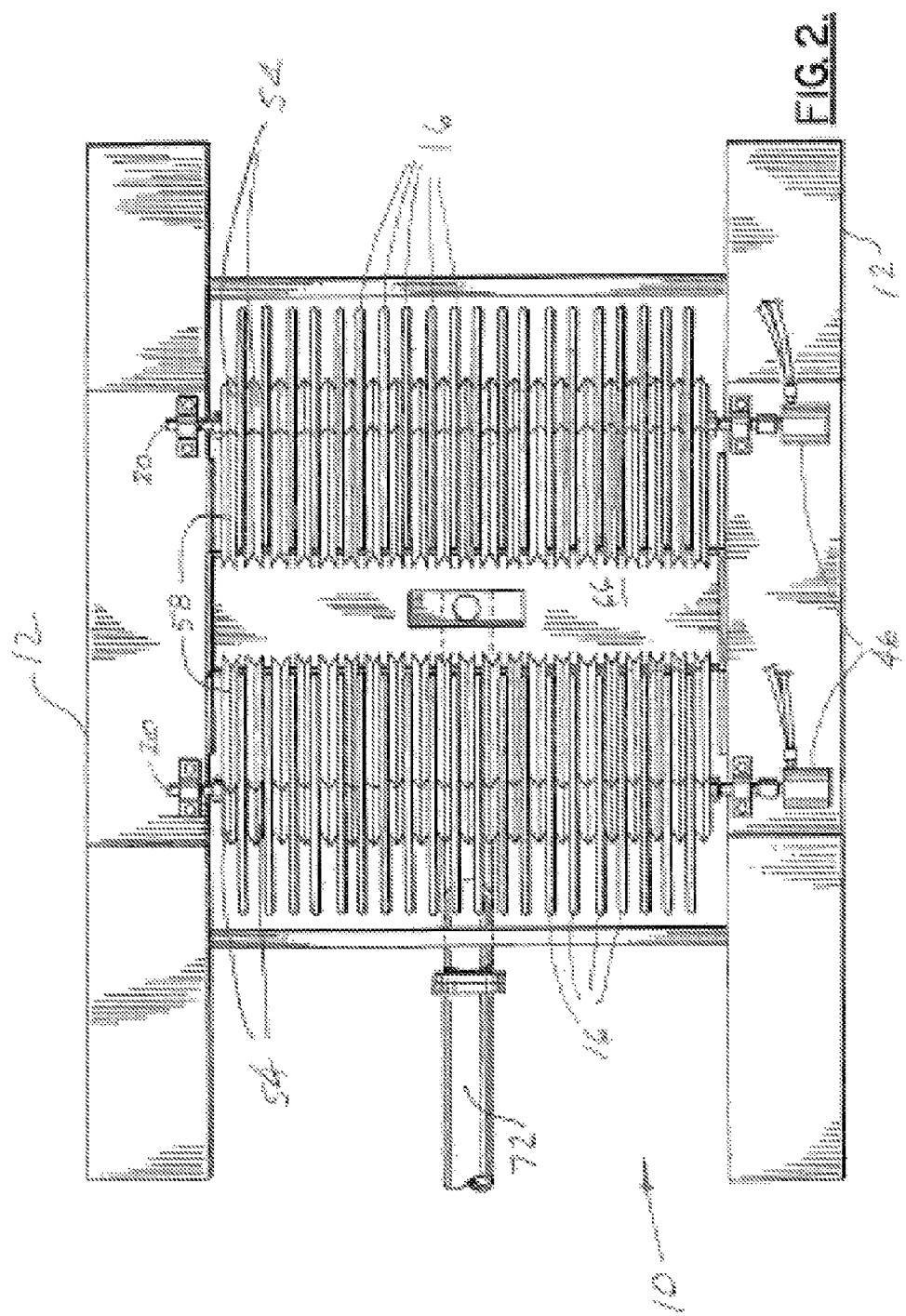
FIG. 2 is a top view taken along lines 2-2 in FIG. 1.

FIGS. 1 and 2 generally depict the device of the present invention as preferably embodied in connection with a disc skimmer 10. Skimmer 10 is preferably equipped with a float such as pontoons 12, which allow the device to floatably rest on the surface 14 of the body of water or other suspending liquid from which the oil or other liquid hydrocarbons or contaminate is to be removed. The pontoons may be provided with a sloped forward portion 13 to facilitate towing of the skimmer in the forward direction.

In the preferred embodiment, a plurality of discs 16 is supported by the pontoons 12. Discs 16 are rotatable about an axis 18 which in the preferred embodiment is substantially parallel to the water surface 14. The axis of rotation 18 for discs 16 is preferably positioned relative to pontoons 12, sufficiently near the water surface 14, such that when the device is floating on the water, a portion of each disc 16 is below and a portion of each disc 16 is above the water surface 14 as best depicted in FIG. 1.

Figure 3:
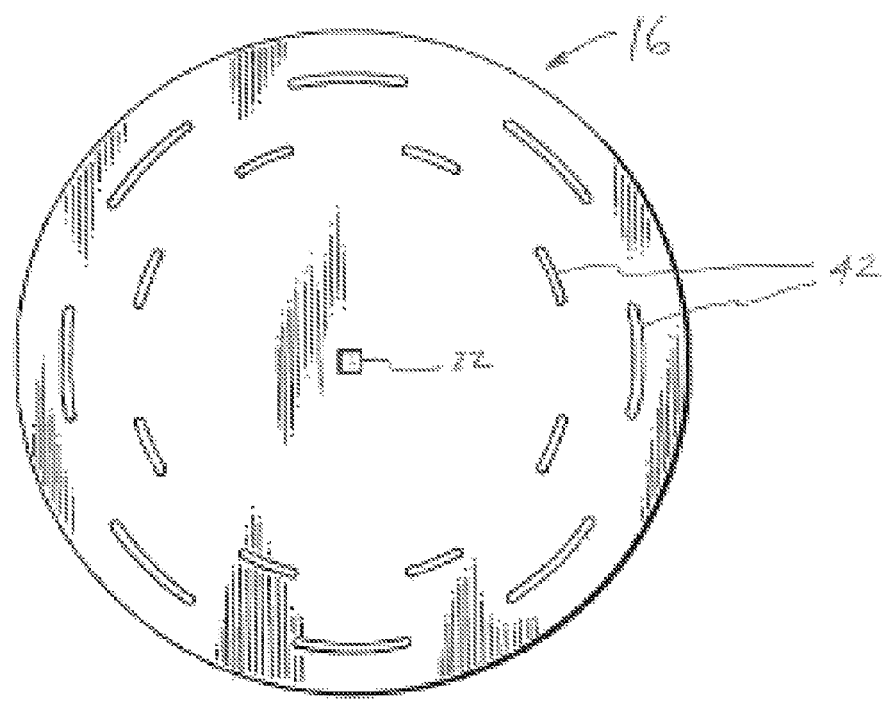
FIG. 3 is a side elevational view of a disc used in connection with the invention depicted in FIG. 1.
Figure 10:
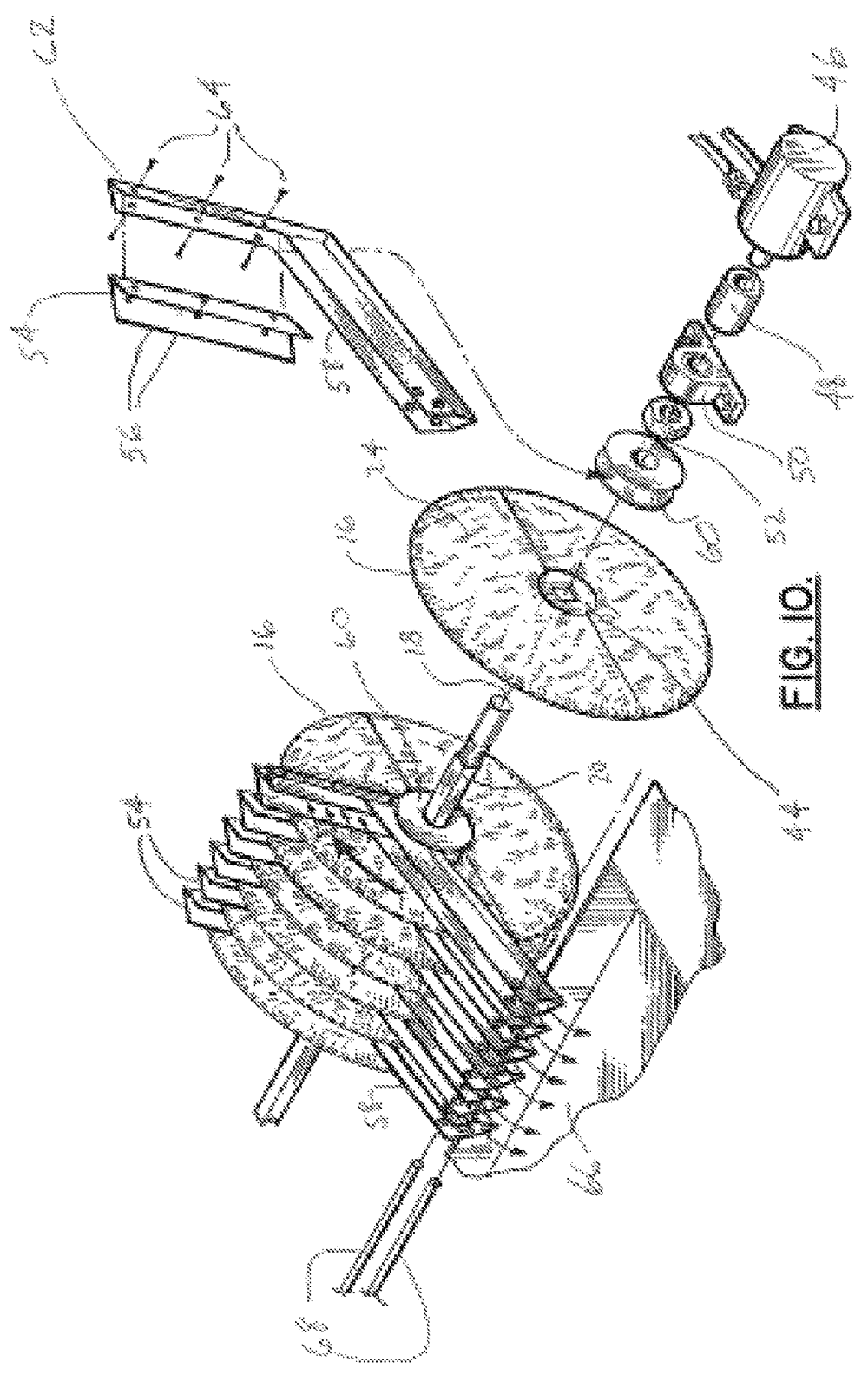

Discs 16 are preferably thin, circular-shaped plates, as shown in FIGS. 3 and 10. Discs 16 can be comprised of any rigid material, preferably metal, such that the discs maintain their shape and orientation when in use. Discs 16 are preferably axially mounted on a rotating shaft 20, as depicted in FIGS. 2 and 10. Each disc 16 preferably has a center opening 22 which is shaped to correspond with the cross-sectional shape of shaft 20, as for example the square shape shown in FIGS. 3 and 10.

Figure 7:
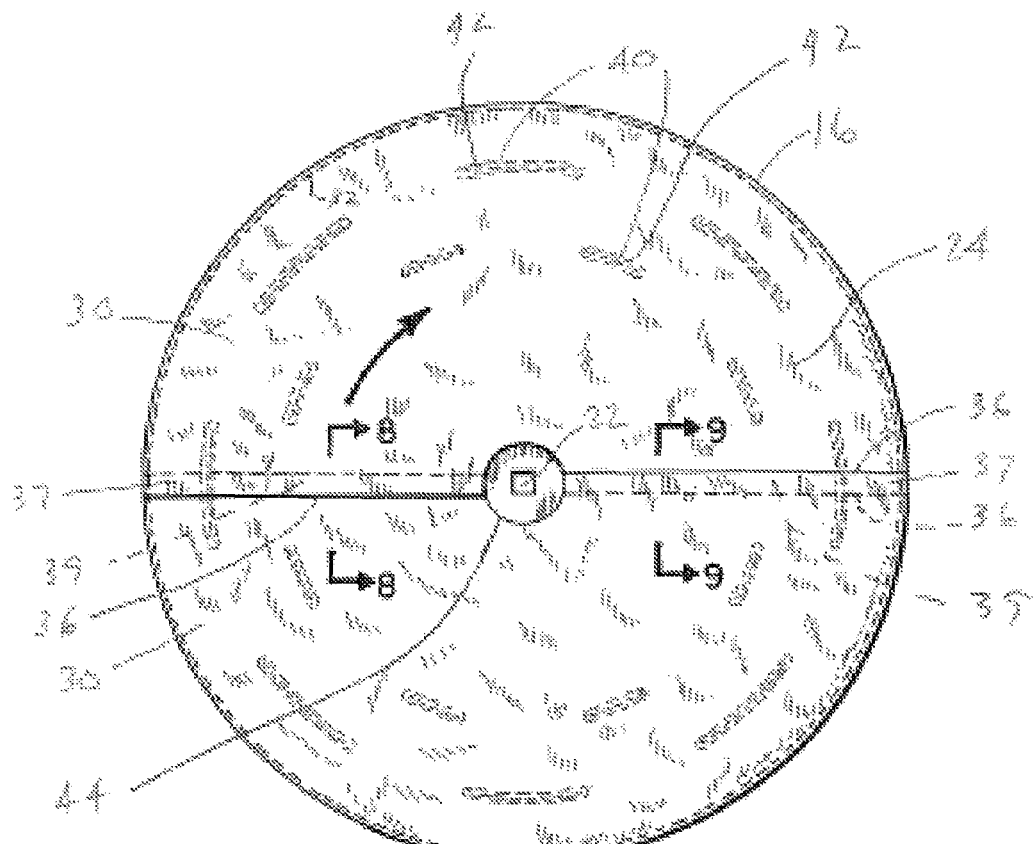
FIG. 7 is a side elevational view showing the disc depicted in FIG. 6 after it has been sandwiched inside and completely covered by the two pockets depicted in FIG. 6.

Discs 16 are covered, either partially or fully, with a sorbent material 24, preferably the "Fuzzy" type oil-sorbent material offered by Abanaki Corporation of Chagrin Falls, Ohio. As best shown in FIGS. 4, 5, 8 and 9, the sorbent material 24 preferably has a great multitude of short, hair-like fibers 26 no more than about 0.25 inches in length, extending like a dense coat of short fur from a flexible skin 28. Skin 28 is preferably made of a durable material such as polypropylene or polyethylene. The fibers 26 of sorbent material 24 may have a "nap" such that when fibers 26 are rubbed in the direction of the nap, they tend to lay down, and when fibers 26 are rubbed against the direction of the nap, they tend to stand up. In the preferred embodiment of disc skimmer 10, each disc 16 is substantially covered with sorbent material 24, as best shown in FIGS. 7 and 10. Sorbent material 24 is preferably configured to correspond with the shape of the disc being covered thereby, as for example the circular shape shown in FIG. 7.

Figure 4:
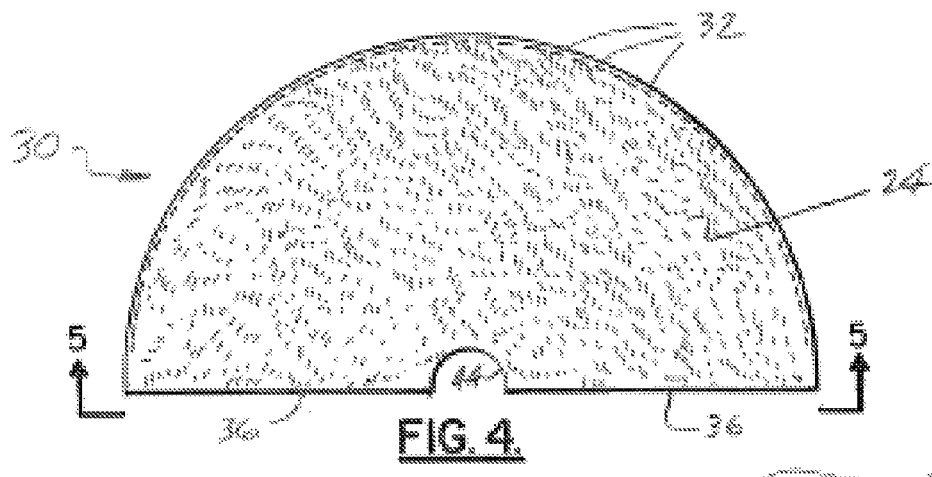
FIG. 4 is a side elevational view of a semi-circular shaped pocket of oil sorbent material used to cover the disc depicted in FIG. 3.
Figure 5:
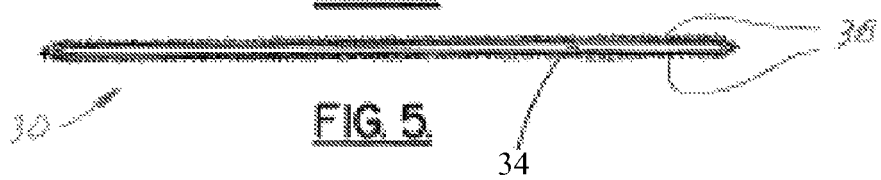
FIG. 5 is an end view taken along lines 5-5 of FIG. 4.
Figure 6:
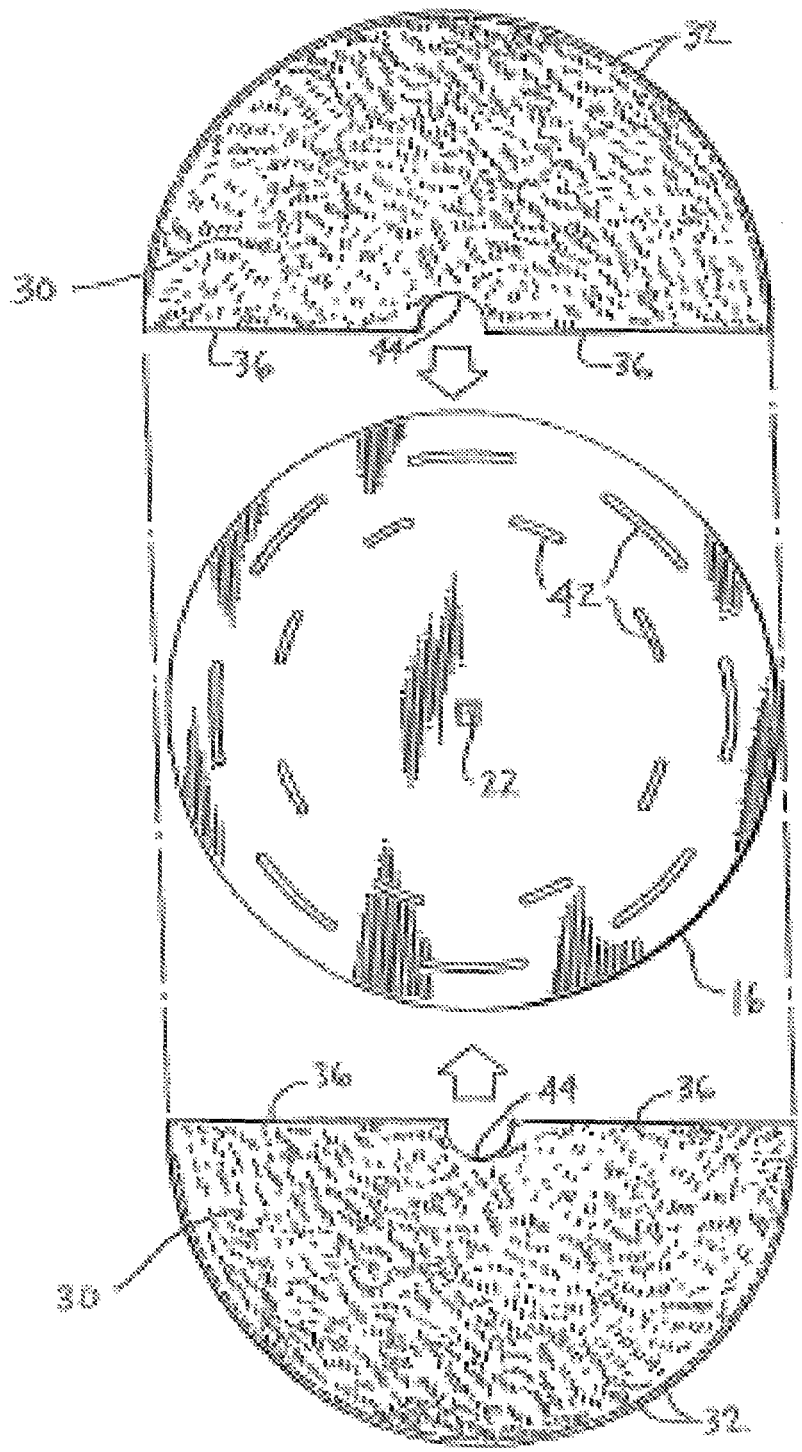
FIG. 6 is a side elevational view showing two of the pockets depicted in FIG. 4, located above and below the disc depicted in FIG. 3, indicating how the pockets are to be slid together so as to sandwich and cover the disc inside the pockets.

If the sorbent material 24 has a nap, then the material covering each disc is preferably comprised of two semi-circular shaped pockets 30, as depicted in FIGS. 4 through 6. Each pocket 30 is comprised of two semi-circular shaped halves of sorbent material which are initially fastened together along their semi-circumferences, as for example by stitches 32 as shown in FIG. 4, with fibers 26 on the outside and skin 28 on the inside of pocket 30. Accordingly, each pocket 30 contains an opening 34 which allows the pockets to slip over, accommodate and completely sandwich disc 16, as shown in FIGS. 6 and 7. Each pocket 30 is also provided with an opening 44 to accommodate rotating shaft 20 which passes therethrough, as best depicted in FIGS. 4, 6, 7 and 10.

Figure 8:
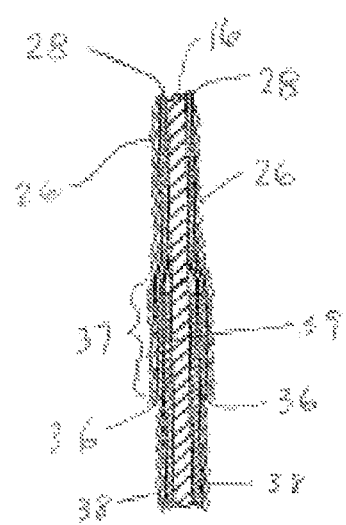
FIG. 8 is a fragmentary, cross-sectional view taken along lines 8-8 of FIG. 7, showing the orientation of the overlapping and overlapped flaps located on the left side of the pockets depicted in FIG. 7.
Figure 9:
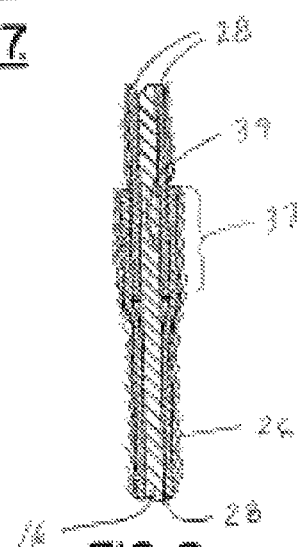
FIG. 9 is a fragmentary, cross-sectional view taken along lines 9-9 of FIG. 7, showing the orientation of the overlapping and overlapped flaps located on the right side of the pockets depicted in FIG. 7.

The straight edges 36 of pockets 30 preferably over-lap each other when pockets 30 are brought together, creating overlapping flaps 37 and corresponding overlapped flaps 39, as best shown in FIGS. 7-9. To keep pockets 30 in place, sandwiched around disc 16, the overlapping flaps 37 and the overlapped flaps 39 are fastened together by fastening means which are well known in the trade, e.g., by the use of glue or other fastening means such as Velcro®.

In order to prevent disc 16 from rotating separate and independent from its covering of sorbent material 24, the respective sides 38 of each pocket 30, as best shown in FIG. 5, are preferably sewn together via stitches 40 which pass through disc 16 by way of a plurality of slots 42 in the disc, as depicted in FIGS. 3, 6 and 7. In addition or as an alternative to the use of stitches 40, pockets 30 may be maintained in place on disc 16 by the use of other fasteners known in the trade, such as Velcro® or snaps passing through slots 42, or via the use of double-sided adhesive tape. For example, a strip of double-sided adhesive tape may first be adhered to disc 16, such that when the disc 16 is then sandwiched inside pocket 30, the skin side 28 of the pocket can become adhered to the other side of said tape.

Disc skimmer 10 may have one or more rows of discs 16, each row having a plurality of discs 16 axially mounted on respective shafts 20, as best shown in FIG. 2. In the preferred embodiment shown in FIGS. 1 and 2, the two rows of discs are rotated in opposite directions as indicated by arrows 45, the forward row rotating counter-clockwise and the aft row rotating clockwise, as shown in FIG. 1.

Shaft 20 is preferably rotated via power supplied by a motor, such as hydraulic motor 46 depicted in FIGS. 2 and 10. Hydraulic motor 46 is attached to rotating shaft 20 in a way that is well known in the trade, as for example by the combination of sleeve 48, bearing 50 and nut 52 shown in FIG. 10.

Scrapers 54, which are preferably V-shaped as shown in FIG. 10, are located above water surface 14 running along the sides of discs 16, as best shown in FIGS. 1, 2 and 10. Scrapers 54 are preferably made of a rigid but somewhat pliant material such as hard plastic. The side edges 56 of scrapers 54 are in contact with and bear against discs 16 and their respective coverings of sorbent material 24.

As hydraulic motor 46 rotates shaft 20, the discs 16 which are axially mounted on said shaft likewise rotate, such that the disc portions which were immersed below water surface 14 are rotated above the water surface, carrying oil which has been sorbed by the material 24 covering the disc portions which were immersed. As the discs continue to rotate, the oil-sorbed portions of material 24 are rotated further and thereby brought into contact with the side edges 56 of scrapers 54, which scrape the sorbed oil from the material as best shown in FIG. 10.

In the preferred embodiment, the V-shaped configuration of scrapers 54 facilitates the collection and channeling of scraped oil which falls by the force of gravity from scrapers 54 into a trough assembly which is in fluid communication with scrapers 14. Said trough assembly is configured to collect and dispose oil, and said assembly includes trough collection members 58, as best depicted in FIGS. 1, 2 and 10. Trough collection members 58 are also preferably V-shaped, and said members 58 preferably rest on and are supported by spacers 60. Spacers 60 preferably have V-shaped surfaces, as best shown in FIG. 10, and said spacers 60 are preferably axially mounted on shaft 20.

In the preferred embodiment shown in FIG. 10, a scraper mounting support 62 extends from and is in fluid connection with trough collection member 58. Scrapers 54 can be attached to scraper mounting support 62 by means which are well known in the art, as for example by pop rivets 64 as shown in FIG. 10.

Trough collection members 58 are inclined downwardly in the direction of sump 66 as shown in FIGS. 1 and 10, thereby facilitating the flow of oil via gravity from the trough collection members 58 into sump 66. As shown in FIG. 10, the oil exiting trough collection members 58 falls by gravity into sump 66. In the preferred embodiment, the trough assembly also includes trough support such as rods 68 depicted in FIG. 10 which support, reinforce and connect the oil-exiting ends of trough collection members 58.

From sump 66, the oil can be pumped via pump 70 through discharge conduit 72, which conveys the recovered oil out of and away from disc skimmer 10 to a remote location for treatment, storage or further handling. A relief valve 74 as depicted in FIG. 1 may be situated downstream from pump 70 in order to relieve hydraulic pressure in conduit 72 in case the conduit should become clogged or blocked.

It will be understood that the oil removal process described above is continuing and ongoing as the discs 16 continue to rotate non-stop. The oil-sorbed portion of material 24 covering each disc 16, having rotated under and past scrapers 54, is thereby relieved of most if not substantially all of the oil it was carrying and, as the disc rotation continues, becomes immersed again in the ongoing process as described above.

In order to minimize the risk that straight edges 36 of pockets 30, as shown in FIGS. 4-9, may become unfastened or otherwise separated when being rotated under scraper 54, the overlapping and overlapped flaps of the sorbent material covering a particular disc are preferably configured differently, depending upon whether that disc is used in clockwise or counterclockwise rotation. FIGS. 7-9 show the preferred configuration of overlapping flaps 37 and overlapped flaps 39 for a clockwise-rotating disc, as for example the discs shown in FIG. 10, as well as the aft row of discs shown in FIG. 1.

Referring to the upper pocket 30 in FIGS. 7 and 8, the straight edges 36 of the left side of said upper pocket are used as part of overlapping flap 37, while the straight edges 36 of the right side of said upper pocket, as shown in FIGS. 7 and 9, are used as part of overlapped flaps 39. By virtue of said configuration, as said disc rotates clockwise as depicted in FIGS. 7 and 10, scrapers 54 will have a tendency to push overlapping flap 37 down and keep it in place over the overlapped flap 39.

For discs to be used for counterclockwise rotation, as for example the discs in the forward row shown in FIG. 1, the configuration of overlapping and overlapped flaps would preferably be reversed as compared to a clockwise-rotating disc. More specifically, for a counterclockwise-rotating disc, the straight edges of the left side of the upper pocket are preferably used as part of overlapped flaps 39, while the straight edges 36 of the right side of that same pocket are used as overlapping flaps 37.

If sorbent material 24 has a nap, then such sorbent material covering disc 16 is preferably oriented relative to said disc in the preferred embodiment such that as the disc rotates, the fibers 26 of sorbent material 24 are scraped by scrapers 54 in the general direction of the nap, tending to lay said fibers down as they pass under the scraper. It is believed that it is more advantageous for scrapers 54 to scrape sorbent material 24 in the direction of the nap rather than against the direction of the nap, in order to avoid the risk of excessive wear, tear and loss of fibers 26. Accordingly, the nap orientation of sorbent material 24 in the top pocket depicted in FIG. 7 will preferably be opposite of the nap orientation for the bottom pocket shown in FIG. 7. Similarly, the nap orientation of the sorbent material 24 covering clockwise-rotating discs will preferably be opposite of the nap orientation of the sorbent material covering counterclockwise-rotating discs.

The sorbent material 24 covering disc 16 can be easily removed from the discs by disconnecting or otherwise disabling the fasteners. For example, the sorbent material 24 covering the disc in FIG. 7 may be removed by using a knife to cut through the overlapping and underlappng flaps when they are glued together, and by cutting through stitches 40. By way of further example, if Velcro® were used as the fastener keeping the overlapping and overlapped flaps together, the material covering the disc may be removed by simply pulling the Velcro® fasteners apart and cutting through stitches 40.

If nap is not a concern, as for example if sorbent material is used which has little or no nap, then the alternative disc-covering configuration shown in FIGS. 14 and 15 is preferred, as it is quicker and easier to attach and detach from disc 16 than is the case with the embodiments appearing in FIGS. 4 through 7. As shown in the upper drawing of FIG. 14, a fully circular pocket 200 is preferably comprised of two circular-shaped pieces of sorbent material 24, which are fastened together skin-side 201 to skin-side 201 along approximately 180 degrees of their perimeter, as for example by stitches 204. Accordingly, circular pocket 200 contains flap portions 206 which define an opening 202 of pocket 200 accommodating disc 16 into which the disc is inserted. The remaining perimeter of circular pocket 200 may then be fastened together, thereby completely covering and securing disc 16 inside pocket 200, as shown in FIG. 15. To prevent disc 16 from rotating separate and apart from its fully-circular pocket 200, the two circular pieces of sorbent material may be fastened together by way of fasteners passing through slots 42, as for example by stitches 208 as shown in FIG. 15.

Figure 11:
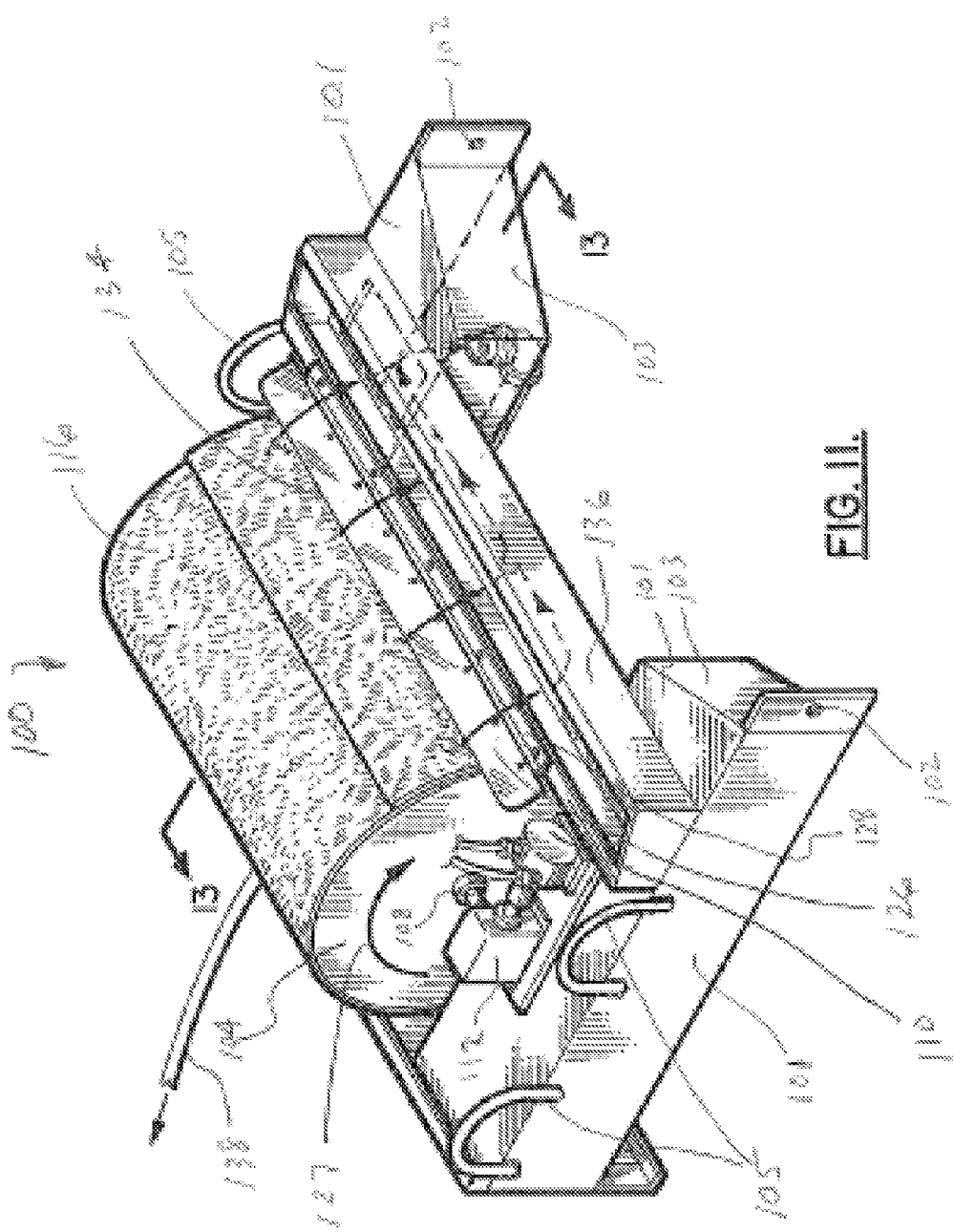
FIG. 11 is a perspective view of the present invention as embodied in connection with a drum skimmer.
Figure 12:
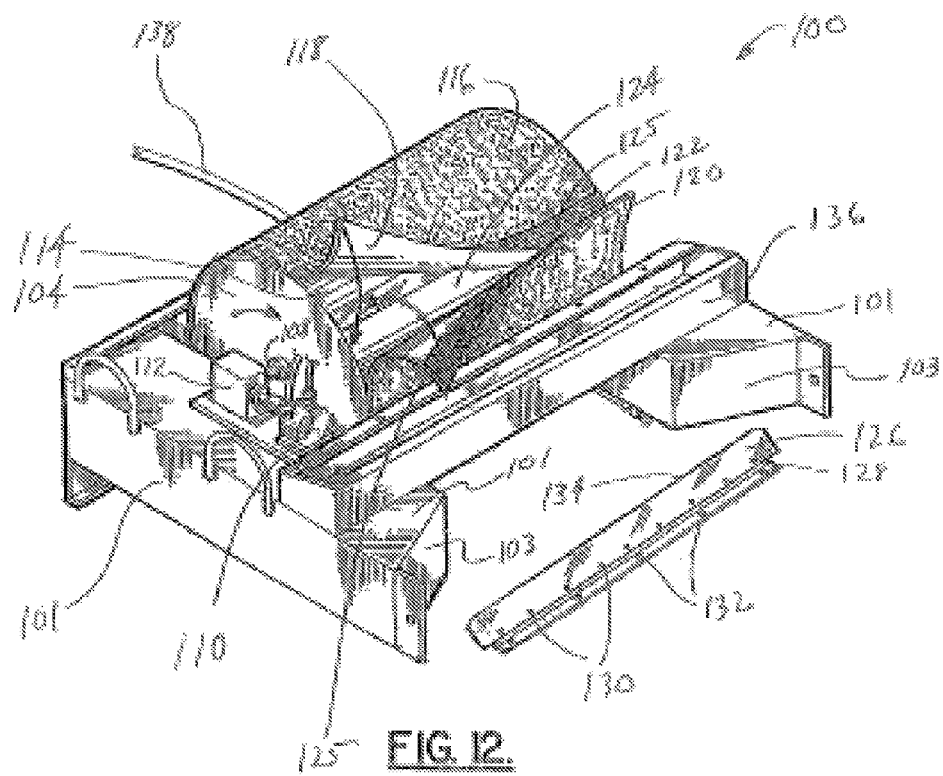
FIG. 12 is a perspective view of the drum skimmer depicted in FIG. 11, showing the placement and orientation of overlapping and overlapped flaps of the sheet of sorbent material covering the surface of the drum.
Figure 13:
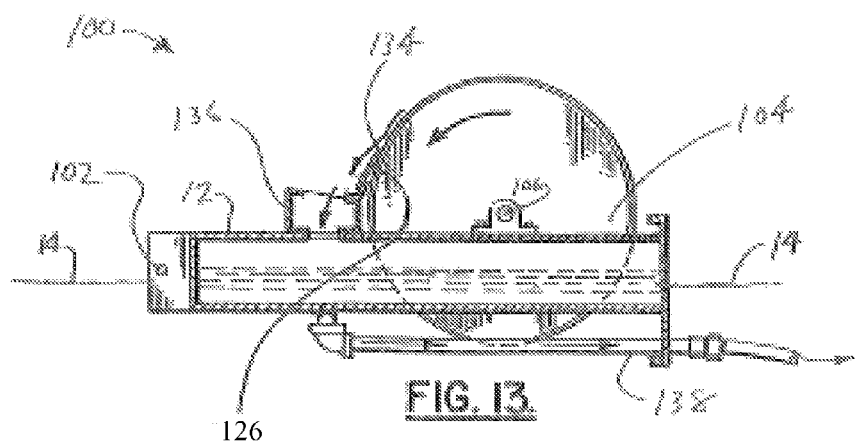
FIG. 13 is a cross sectional view taken along lines 13-13 of FIG. 11.

FIGS. 11-13 generally depict the present invention as preferably embodied in connection with a drum skimmer 100. Drum skimmer 100 is preferably equipped with flotation means, such as pontoons 101, which allow the device to floatably rest on the surface 14 of the body of water or other suspending liquid from which oil or other liquid hydrocarbons or contaminate is to be removed. Pontoons 101 may be provided with sloped forward portions 103 to facilitate towing of drum skimmer 100 in the forward direction, as for example through the use of tow lines attached via eyelets 102. Pontoons 101 may also be equipped with handles 105 to facilitate lowering and lifting of the drum skimmer device into and out of the water.

In the preferred embodiment depicted in FIG. 11, at least one drum 104 is supported by pontoons 101, said drum being rotatable about an axis 106 which is substantially parallel to the water surface 14. The axis of rotation 106 for drum 104 is preferably positioned relative to pontoons 101, sufficiently near the water surface 14, such that when the device is floating, a portion of drum surface 114 is below and a portion of drum surface 114 is above the water surface as shown in FIG. 13.

Drum 104 is preferably cylindrically-shaped and preferably hollow with closed ends. Drum 104 is comprised of a rigid material, preferably metal, such that the drum can maintain its shape and orientation when in use. Drum 104 is preferably axially mounted on rotating shaft 108, as best depicted in FIGS. 11 and 12. Shaft 108 is preferably rotated via power supplied by a motor, such as hydraulic motor 110. In the preferred embodiment shown in FIG. 11, hydraulic motor 110 is attached to rotating shaft 108 in a way that is well known in the trade, and may include a gear reducer 112 which allows for control of the rotational speed of drum 104.

The cylindrically-shaped surface 114 of drum 104 is covered, either partially or fully, with sorbent material 116, preferably the "Fuzzy" type oil-sorbent material offered by Abanaki Corporation of Chagrin Falls, Ohio. Sorbent material 116 preferably has a great multitude of short, hair-like fibers no more than approximately 0.25 inches in length, extending like a dense coat of short fur from a flexible skin 118 as depicted in FIG. 12. Skin 118 is preferably made from a durable and flexible material such as polypropylene or polyethylene. The fibers of sorbent material 116 may have a "nap" such that when the fibers are rubbed in the direction of the nap, they tend to lay down, and when the fibers are rubbed against the direction of the nap, they tend to stand up.

In the preferred embodiment of drum skimmer 100, the cylindrically-shaped surface 114 of drum 104 is completely covered with sorbent material 116, as best shown in FIG. 11. The sorbent material 116 is preferably applied to surface 114 of drum 104 in the form of a single, rectangular-shaped sheet of material 116. Said sheet of material preferably has a width corresponding to the axial length of drum 104, and said sheet has a length which at least slightly exceeds the circumference of the drum, such that there will be an overlapping flap 120 and overlapped flap 122 of material 116 when the sheet is completely wrapped around drum 104, as best depicted in FIG. 12.

To keep the sheet of sorbent material 116 wrapped around drum 104, the overlapping flap 120 and the overlapped flap 122 are preferably fastened together using well known fastening means, as for example by using Velcro® as shown in FIG. 12, or by using other fastening means such as glue. Velcro® is registered trademark for a hook and loop fastener which includes a first portion having a plurality of hooks and a second portion having a plurality of loops as is well known in the art.

In order to prevent drum 104 from rotating separate and independent from its covering of sorbent material 116, an adherent such as a strip of double-sided adhesive tape 124, as shown in FIG. 12, can be used. It will be understood that tape 124 is adhesive on both sides, such that one side of the tape adheres to drum surface 114 and the other side of the tape adheres to skin 118 of sorbent material 116.

In the preferred embodiment of drum skimmer 100 shown in FIG. 12, the sheet of sorbent material 116 is applied to drum surface 114 as follows: a strip of double-sided adhesive tape 124 is applied so that it adheres to the skin 118 of the sheet running along, underneath, and adjacent to the edge of the sheet that is to be used as overlapped flap 122. Said overlapped flap 122 is then positioned as desired on drum 104, skin-side 118 down, so that the other side of tape strip 124 is brought into contact with and adheres to drum surface 114. It will be understood that the strip of tape 124 or other adherent may be placed first on the drum surface 114, and that the skin side of the sheet running along, underneath, and adjacent to overlapped flap 122 may then be pressed into place on top of drum surface 114, thereby becoming adhered to the strip of tape or other adhesive that had been first placed on the drum.

After overlapped flap 122 has been secured to drum 104, the drum is rotated through one revolution, such that the sheet of sorbent material 116 becomes wrapped around and preferably covers the entire cylindrically-shaped surface 114 of the drum. During this process, additional strips of double-sided tape or other adherents may be applied between the skin 118 and the drum surface 114, thereby further securing the sheet of sorbent material 116 to drum 104. For example, additional strips of double-sided tape may be applied at every quarter-turn of drum 104 as the sheet of sorbent material 116 is being wrapped around drum 104.

To complete the application of the sorbent sheet of material 116 to drum 104, overlapping flap 120 and overlapped flap 122 are preferably fastened together, as for example, by use of fastening means such as corresponding strips 125 of Velcro® as shown in FIG. 12 or by other fastening means such as glue.

In the preferred embodiment shown in FIGS. 11 and 12, the direction in which the fastened flaps 120 and 122 rotate under and past scraper 126 determines which flap is to be used as overlapped flap 122 and which is to be used as overlapping flap 120. More specifically, the fastened flaps are configured such that as they rotate under and past scraper 126, the scraper will have a tendency to push overlapping flap 120 down and keep it in place over the overlapped flap 122, as shown in FIGS. 11 and 12.

In the preferred embodiment of drum skimmer 100, the sorbent material 116 covering drum 104 is oriented relative to the drum such that as the drum rotates, the fibers of sorbent material 116 are scraped by scraper 126 in the general direction of the nap, tending to lay said fibers down as they pass under scraper 126.

The sorbent material 116 covering drum 104 can be easily removed from the drum by disabling or disconnecting the fasteners. Referring to FIG. 12 for example, the overlapping and overlapped flaps may be disconnected from each other by simply pulling overlapping flap 120 off of the overlapped flap 122. If said flaps had been fastened together by glue, a knife could be used to cut through the flaps where they were glued together, thereby effecting separation of the flaps.

After the overlapping and overlapped flaps have been disconnected, material 116 can be unwound off drum 104 by simply pulling on the material. As the material is pulled and completely wound off drum 104, said drum will turn through one complete revolution. During that process, the resistance to movement provided by the double-sided tape strip(s) or other adherents may be easily overcome by simply pulling the material 116 with a bit more force, away from the drum at the place(s) where the tape or other adherent was located.

Scraper 126 can be connected to drum skimmer 100 by means of mounting bracket 128 as shown in FIGS. 11 and 12. Scraper 126 may be attached to bracket 128 in any number of ways which are well known in the trade, for example by pop rivets 130 shown in FIG. 12, and mounting bracket 128 can in turn be similarly attached to drum skimmer 100, as for example by passing fasteners through eyelets 132 in bracket 128. Scraper 126 is preferably made of a rigid but somewhat pliant material such as hard plastic. The edge 134 of scraper 126 is in contact with and bears against drum 104 and the sorbent material 116 covering the drum surface 114.

As hydraulic motor 110 turns shaft 108, drum 104 which is axially mounted on said shaft likewise turns, such that the portion of drum 104 which was immersed below water surface 14 is rotated above the water surface, carrying oil which has been sorbed by the material 116 covering the portion of drum surface 114 which had been immersed. As the drum continues to rotate, the oil-sorbed portion of drum-covering material 116 is rotated further and is thereby brought into contact with scraper edge 134, which scrapes the sorbed oil from the material as best shown in FIGS. 11 and 13. As depicted in FIG. 13, the scraped oil flows by the force of gravity into a trough assembly which is in fluid communication with scraper 126. The trough assembly is configured to collect and dispose oil, and said assembly includes trough collection member 136. Trough collection member 136 may extend between and may be supported by pontoons 101, as best depicted in FIGS. 11 and 12.

In the preferred embodiment, trough collection member 136 is in fluid communication with the interior of at least one of the pontoons 101, as shown in FIG. 13, such that the oil can drain via gravity from trough collecting member 136 into said pontoon which serves as a sump for the oil, all as depicted in FIG. 13. From there, the oil can be transported from said pontoon via discharge line 138, with the assistance of a pump, vacuum or similar means, thereby moving the oil out of and away from drum skimmer 100 to a remote location for treatment, storage or further handling.

It will be understood that the oil recovery operation described above in connection with drum skimmer 100 is continuous and on-going as drum 104 continues to rotate non-stop. The oil-sorbed portion of material 116 covering drum surface 114, having rotated under and past drum scraper 126, is thereby relieved of most if not substantially all of the oil it was carrying and, as the drum rotation continues, becomes immersed again in the ongoing process as described above.

It will also be understood that there may be application of the present invention in connection with disc skimmers and other rigid-surface skimmers which are not equipped with or mounted directly on pontoons or other flotation means. For example, the present invention may be employed in connection with an industrial process involving a tank of water or other suspending liquid having a surface elevation with little or no fluctuations. In such application, the device of the present invention would not require pontoons or other floatation means but could instead be affixed to the side of the tank. Alternatively, the device of the present invention could be kept afloat indirectly, i.e., without its own flotation means, as for example by being secured to the hull of a boat or other floating structure. In such applications, the discs, drum or other rigid-surface skimmers of the present invention could be attached to a non-floating structural support, or to an independently floating structure, at a location such that a portion of the skimming surface is above and a portion of the skimming surface is below the water surface.

Moreover, it will be understood that as an alternative to scrapers, the sorbed oil could be removed from the sorbent material of the present invention by way of one or more rollers mounted in place of scrapers. The rollers bear against the sorbed material thereby squeezing the sorbed oil from the sorbed material.

The present invention has been subjected to rigorous testing conducted on numerous occasions by qualified personnel at the Ohmsett test facility located in New Jersey, which is managed by the United States Minerals Management Service. Those tests were witnessed by representatives of various organizations having an interest in oil spill recovery, including the United States Coast Guard, Tesoro Maritime Company, BP Shipping Limited and ConocoPhillips Company. The tests were conducted in accordance with the most recent (2008) standards of the American Society of Testing and Materials ("ASTM"), specifically the (F2709-08) Standard Test Method for Determining Nameplate Recovery Rate of Stationary Oil Skimmer Systems. The tests measured, among other things, the oil recovery rate ("ORR") of the present invention in terms of the volume of oil recovered per unit of time (gallons per minute or "gpm").

The tests showed that the ORR for a disc skimmer equipped with sorbent material in accordance with the preferred embodiment of the present invention was on average approximately three times higher than the ORR for the same disc skimmer which was not so equipped. For example, in one representative test, the ORR for a disc skimmer equipped in accordance with the present invention was approximately 386 gpm, whereas the ORR for that same disc skimmer which was not so equipped was only 128 gpm. The oil used in conjunction with that test was "fresh" Alaska North Slope ("ANS") crude oil having the following properties: Density, g/ml at 77° F.=0.876; and Viscosity, cP at 82° F.=14.

PARTS LIST

PART NO. DESCRIPTION
10 disc skimmer
12 float (pontoons) of disc skimmer 10
13 sloped forward portion of pontoons 12
14 water surface
16 discs
18 axis of disc rotation
20 rotating shaft for discs
22 center opening of disc 16
24 sorbent material covering disc 16
26 hair-like fibers of sorbent material
28 skin of sorbent material 24
30 semi-circular pocket of sorbent material
32 stitches on semi-circumference of pocket 30
34 pocket 30 opening to accommodate disc 16
36 straight edges of pocket 30
37 overlapping flap of pocket 30
38 sides of pocket 30
39 overlapped flap of pocket 30
40 stitches in pocket 30 passing through disc slots 42
42 slots in disc 16
44 opening in pocket 30 to accommodate shaft 20
45 arrow showing direction of disc rotation
46 hydraulic motor of disc skimmer 10
48 sleeve
50 bearing
52 nut
54 disc scrapers
56 side edges of scrapers 54
58 trough collection members of disc skimmer 10
60 disc spacers supporting trough collection members 58
62 scraper 54 mounting support
64 pop rivets connecting scraper 54 and support 62
66 sump of disc skimmer 10
68 trough support rods
70 pump
72 discharge conduit of disc skimmer 10
74 relief valve
100 drum skimmer
101 flotation means (pontoons) of drum skimmer
102 eyelets for towing
103 sloped forward portions of pontoons 101
104 drum
105 handles
106 axis of rotation of drum 104
108 rotating shaft for drum 104
110 hydraulic motor of drum skimmer 100
112 gear reducer
114 drum surface
116 sorbent material covering drum surface 114
118 skin of sorbent material 116
120 overlapping flap of material 116
122 overlapped flap of material 116
124 strip of double-sided adhesive tape attaching overlapped flap 122 to drum surface 114
125 Velcro® strips
126 drum scraper
128 mounting bracket for scraper 126
130 pop rivets connecting scraper 126 and bracket 128
132 eyelets in bracket 128
134 edge of scraper 126
136 trough collection member of drum skimmer 100
138 discharge line of drum skimmer 100
200 fully circular pocket
201 skin side of pocket 200
202 pocket 200 opening to accommodate disc 16
204 stitches in perimeter of pocket 200
206 flap portions of pocket 200
208 stitches in pocket 200 through disc slots 42

What is claimed is:

1. An oil skimming device for the removal of oil located at the surface of a body of water, comprising:
 a float which allows the device to rest on the surface of the body of water from which the oil is to be removed;
 at least one rigid skimming surface, said rigid skimming surface is a substantially cylindrical-shaped drum supported by the float, said rigid skimming surface being rotatable about an axis such that when the device is floating in the water, a portion of the rigid skimming surface is above and a portion of the rigid skimming surface is below the water surface;
 sorbent material removably attached to and substantially covering the skimming surface, said sorbent material is in the form of a sheet with a length that exceeds the circumference of the drum so that when wrapped around the drum said sorbent material provides an overlapping flap and an overlapped flap, said sorbent material configured to rotate with the skimming surface and to sorb oil as the skimming surface is rotated;
 at least one scraper positioned to bear against the skimming surface for removing sorbed oil from the sorbent material as the skimming surface is rotated; and
 a motor operatively connected to said skimming surface, said motor configured to rotate the skimming surface about its axis of rotation.

2. The device of claim 1, wherein the overlapping and overlapped flaps are configured such that as the drum is rotated, the scraper will have a tendency to push the overlapping flap down over the overlapped flap.

3. The device of claim 1, including an adherent for removably attaching the sheet of sorbent material to the surface of the drum.

4. The device of claim 1, wherein the sorbent material comprises:
 a flexible skin; and
 a plurality of fibers.

5. The device of claim 4, wherein the plurality of fibers extend from the flexible skin.

6. The device of claim 4, wherein the plurality of fibers are generally no longer than about 0.25 inches in length.

7. The device of claim 6, wherein said plurality of fibers have a nap such that when the fibers are rubbed in the direction of the nap the fibers tend to lay down and when the fibers are rubbed against the direction of the nap the fibers tend to stand up.

8. The device of claim 4, wherein the flexible skin is comprised of polypropylene or polyethylene.

9. The device of claim 1, wherein the sorbent material is removably attached to the rigid skimming surface by securing the overlapping flap to the overlapped flap.

10. The device of claim 9, wherein the overlapping flap is secured to the overlapped flap by an adhesive.

11. The device of claim 9, wherein the overlapping flap includes a first portion of a hook and loop fastener and the overlapped flap includes a second portion of a hook and loop fastener, wherein the overlapping flap is secured to the overlapped flap by a placing the first portion of the hook and loop fastener in contact with the second portion of the hook and loop fastener.

12. The device of claim 1, wherein the sorbent material is removably attached to the rigid skimming surface by placing adhesive between the sorbent material and the rigid skimming surface.

13. The device of claim 1, wherein the sorbent material is removably attached to the rigid skimming surface by placing double-sided adhesive tape between the sorbent material and the rigid skimming surface.

\* \* \* \* \*